United States Patent
Ulrey et al.

(10) Patent No.: US 9,541,017 B2
(45) Date of Patent: Jan. 10, 2017

(54) THROTTLE BYPASS TURBINE WITH EXHAUST GAS RECIRCULATION

(71) Applicant: Ford Global Technologies, LLC, Dearborn, MI (US)

(72) Inventors: Joseph Norman Ulrey, Dearborn, MI (US); Daniel Joseph Styles, Canton, MI (US); Karen Elizabeth Maceroni, Casco, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 14/508,682

(22) Filed: Oct. 7, 2014

(65) Prior Publication Data

US 2016/0097332 A1  Apr. 7, 2016

(51) Int. Cl.
  *F02M 25/07* (2006.01)
  *F02D 41/00* (2006.01)
  (Continued)

(52) U.S. Cl.
  CPC ......... *F02D 41/0065* (2013.01); *F02D 9/1055* (2013.01); *F02D 41/005* (2013.01); *F02M 26/17* (2016.02); *F02M 26/23* (2016.02); *F02M 35/10222* (2013.01); *F02D 41/006* (2013.01); *F02D 2021/083* (2013.01); *F02D 2041/0067* (2013.01); *F02D 2200/0414* (2013.01);
  (Continued)

(58) Field of Classification Search
  CPC ........ F02M 26/05; F02M 26/10; F02M 26/17; F02M 26/19; F02M 26/64; F02M 26/41; F02M 26/34; F02M 26/31; F02M 26/32; F02M 26/33; F02M 26/22; F02M 26/20; F02M 26/09; F02M 26/14; F02M 26/13; F02M 26/02; F02M 35/10229; F02M 35/10222; F02M 25/0727; F02M 25/072; Y02T 10/144; F02D 41/005; F02D 41/0065; F02D 41/0072; F02D 2009/0252; F02D 2041/0067
  USPC ...................... 123/308, 337, 568.11, 568.15, 568.18,123/568.21, 568.12, 559.1, 568.17, 568.19; 701/108; 60/605.1, 605.2, 606, 613, 614, 60/617, 278, 289, 290, 293, 304
  See application file for complete search history.

(56) References Cited

U.S. PATENT DOCUMENTS 4,426,848 A  * 1/1984  Stachowicz ............. F02B 37/16
                                                                  123/568.12
5,105,784 A    4/1992  Davis et al.
(Continued)

FOREIGN PATENT DOCUMENTS

WO      2011156059 A2    12/2011

OTHER PUBLICATIONS

Galante-Fox, Julie M. et al., "Throttle Icing: Understanding the Icing Mechanism and Effects of Various Throttle Features," SAE Technical Paper 2008-01-0439, 2008 World Congress, Detroit, MI., Apr. 14-17, 2008, 11 pages.

*Primary Examiner* — Hai Huynh
*Assistant Examiner* — Gonzalo Laguarda
(74) *Attorney, Agent, or Firm* — Julia Voutyras; Alleman Hall McCoy Russell & Tuttle LLP

(57) ABSTRACT

Various systems and methods are provided for controlling the temperature of outlet gasses from a throttle bypass turbine. In one embodiment, a method of operating a throttle bypass turbine comprises controlling a temperature of outlet gas flowing out of the turbine by routing the outlet gas through an exhaust gas recirculation heat exchanger posi-
(Continued)

tioned in an exhaust gas recirculation passage, the turbine coupled to an intake passage.

18 Claims, 5 Drawing Sheets

(51) Int. Cl.
    *F02M 35/10*     (2006.01)
    *F02D 9/10*     (2006.01)
    *F02D 21/08*     (2006.01)

(52) U.S. Cl.
    CPC ..... *F02D 2200/0418* (2013.01); *F02M 26/05* (2016.02); *F02M 26/10* (2016.02); *F02M 26/36* (2016.02)

(56) References Cited

U.S. PATENT DOCUMENTS

| | | | |
|---|---|---|---|
| 5,425,239 A * | 6/1995 | Gobert | F02B 37/00 60/605.2 |
| 5,611,203 A * | 3/1997 | Henderson | F02M 26/43 60/605.2 |
| 6,003,315 A * | 12/1999 | Bailey | F02B 29/0425 60/605.2 |
| 6,062,027 A * | 5/2000 | Landfahrer | F02B 37/00 60/605.2 |
| 6,216,458 B1 * | 4/2001 | Alger | F01N 3/02 123/568.12 |
| 6,360,719 B1 | 3/2002 | Uitenbroek | |
| 6,367,256 B1 | 4/2002 | McKee | |
| 6,622,965 B1 | 9/2003 | Sergiy | |
| 6,810,866 B2 | 11/2004 | Geiser | |
| 7,469,691 B2 | 12/2008 | Joergl et al. | |
| 8,205,602 B2 | 6/2012 | Pellico | |
| 8,230,843 B2 | 7/2012 | Kurtz | |
| 8,365,519 B2 * | 2/2013 | Wirbeleit | F01N 3/046 60/304 |
| 8,365,528 B2 | 2/2013 | Leone et al. | |
| 8,763,385 B2 | 7/2014 | Leone et al. | |
| 2003/0114978 A1 * | 6/2003 | Rimnac | F02M 26/47 701/108 |
| 2004/0093866 A1 * | 5/2004 | Ishikawa | F02M 26/07 60/605.2 |
| 2005/0028796 A1 * | 2/2005 | Tussing | F02B 33/44 123/568.22 |
| 2013/0066535 A1 | 3/2013 | Leone et al. | |
| 2013/0092125 A1 | 4/2013 | Leone et al. | |
| 2013/0092126 A1 | 4/2013 | Leone et al. | |
| 2013/0152903 A1 | 6/2013 | Leone et al. | |
| 2013/0305716 A1 * | 11/2013 | Rollinger | F02D 41/10 60/605.2 |
| 2014/0157774 A1 | 6/2014 | McConville et al. | |
| 2015/0369101 A1 * | 12/2015 | Leone | F02D 41/025 123/406.12 |
| 2016/0047337 A1 * | 2/2016 | Leone | F01L 1/34 123/406.12 |

* cited by examiner

THROTTLE BYPASS TURBINE WITH EXHAUST GAS RECIRCULATION

FIELD

The field of the disclosure relates to internal combustion engines that utilize exhaust gas recirculation and intake turbines.

BACKGROUND AND SUMMARY

Some internal combustion engines recirculate exhaust gas from an engine exhaust system to an engine intake system, a process referred to as exhaust gas recirculation (EGR), to reduce regulated emissions, among other purposes. For example, an internal combustion engine may include an EGR system which recirculates exhaust gas from an exhaust passage to an intake passage (e.g., intake manifold). Recirculated exhaust gas may be combined with fresh intake air drawn into the intake passage resulting in a mixture of fresh intake air and recirculated exhaust gas. An EGR valve may be controlled to adjust the amount of recirculated exhaust gas flow and achieve a desired intake air dilution based on engine operating conditions. More specifically, the exhaust gas routed through the EGR system may be measured and adjusted based on various engine operating conditions (e.g., engine speed, load, etc.) during engine operation to maintain desirable combustion stability of the engine while providing emissions and fuel economy benefits. The EGR system may be operated for other purposes as well, for example to increase heat flux to aftertreatment devices during an engine and catalyst warm-up phase.

Further, some internal combustion engines include devices such as throttle turbine generator to collect energy from a pressure difference across an intake throttle that may otherwise be wasted. In some examples, a turbine may be positioned in an intake passage and mechanically coupled to a generator which may generate and supply current to a battery of the engine. By charging the battery in this way, fuel economy of the engine may be improved, as compared to charging the battery with an engine driven generator.

EGR systems (e.g., due to an EGR cooler) can generate condensation in an engine intake system. Such condensation can adversely affect fuel combustion in the engine.

U.S. Pat. No. 8,205,602 discloses an internal combustion engine that utilizes EGR. To mitigate condensation produced by an EGR cooler and introduced into an intake system of the engine, a condensation collection system is utilized. Specifically, a condensation line includes an inlet coupled to the intake system and an outlet coupled to a condensation accumulator. A condensation expulsion line is coupled to an output port of the condensation accumulator. A portion of the condensation expulsion line is disposed in contact with an engine exhaust pipe so that, depending on operation of a condensation control valve disposed within the intake system, condensation in the intake system may be expelled therefrom.

The inventors herein have recognized that throttle turbines can also cause the generation of condensation in an engine intake system.

U.S. Pat. No. 8,763,385 discloses an engine system including a throttle turbine generator including a turbine that drives an auxiliary generator. A throttle bypass valve may be controlled to adjust airflow through a throttle bypass in which the turbine is placed, in turn controlling the extent to which the auxiliary generator is driven. The throttle bypass valve may be controlled according to various operating conditions, including airflow to the engine and a state of charge of an engine battery.

The inventors herein have recognized issues with both approaches. In the first approach, inclusion of a condensation collection system introduces additional cost, complexity, and packaging space to the internal combustion engine. In the second approach, the throttle bypass valve is controlled without regard to the potential of the formation of condensation in the intake system. In some examples, the outlet temperature of gasses flowing out of the turbine may decrease linearly with turbine efficiency. This may also lead to condensation in the intake system, which can adversely affect fuel combustion as described above, and/or icing near the throttle body, which can potentially degrade throttle operation.

One approach that at least partially addresses the above issues includes a method of operating a throttle bypass turbine comprising controlling a temperature of outlet gas flowing out of the turbine by routing the outlet gas through an exhaust gas recirculation heat exchanger positioned in an exhaust gas recirculation passage, the turbine coupled to an intake passage.

In a more specific example, the temperature of the outlet gas is controlled according to one or both of a dew point and an icing point at which condensation and icing respectively form in the intake passage.

In another aspect of the example, the temperature of the outlet gas is controlled by adjusting a flow rate of exhaust gas through the exhaust gas recirculation passage.

In yet another aspect of the example, a temperature of a mixture of the outlet gas and intake air in the intake passage is controlled by adjusting a flow rate of the outlet gas In this way, condensation and/or icing in an intake passage, at least partially caused by cooling across a throttle bypass turbine, may be reduced or prevented. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

As described above, some internal combustion engines utilize an exhaust gas recirculation (EGR) system to reduce emissions and control combustion temperature, among other purposes. In some examples, an engine may include an EGR system which recirculates exhaust gas from an exhaust passage to an intake passage (e.g., intake manifold). The proportion of recirculated exhaust gas to fresh intake air drawn into the intake passage may be controlled with an EGR valve to achieve a desired intake air dilution based on engine operation conditions.

Some internal combustion engines, alternatively or in addition to those that employ EGR systems, include a throttle turbine generator to generate energy from a pressure difference across an intake throttle. For example, a turbine may be placed in an intake passage and mechanically coupled to a generator to generate and supply current to an engine battery.

Both EGR systems, (e.g., due to high water content in the EGR system) and throttle turbines, can generate condensation in an engine intake system. In some examples, the outlet temperature of gasses flowing out of a throttle turbine may decrease linearly with turbine efficiency. Sufficiently low outlet temperatures may result in condensation in the intake system as well as icing near the throttle body, which may adversely affect fuel combustion and potentially degrade throttle operation, respectively. In some approaches, low outlet temperatures may be avoided by disabling the generator (e.g., by bypassing the throttle turbine), but at the cost of limiting the power generated. Condensation resulting from operation of the EGR cooler, conversely, may be mitigated by extracting condensation from the intake system via a condensation collection system. The inclusion of such a system, however, introduces additional cost, complexity, and packaging space.

Figure 1:
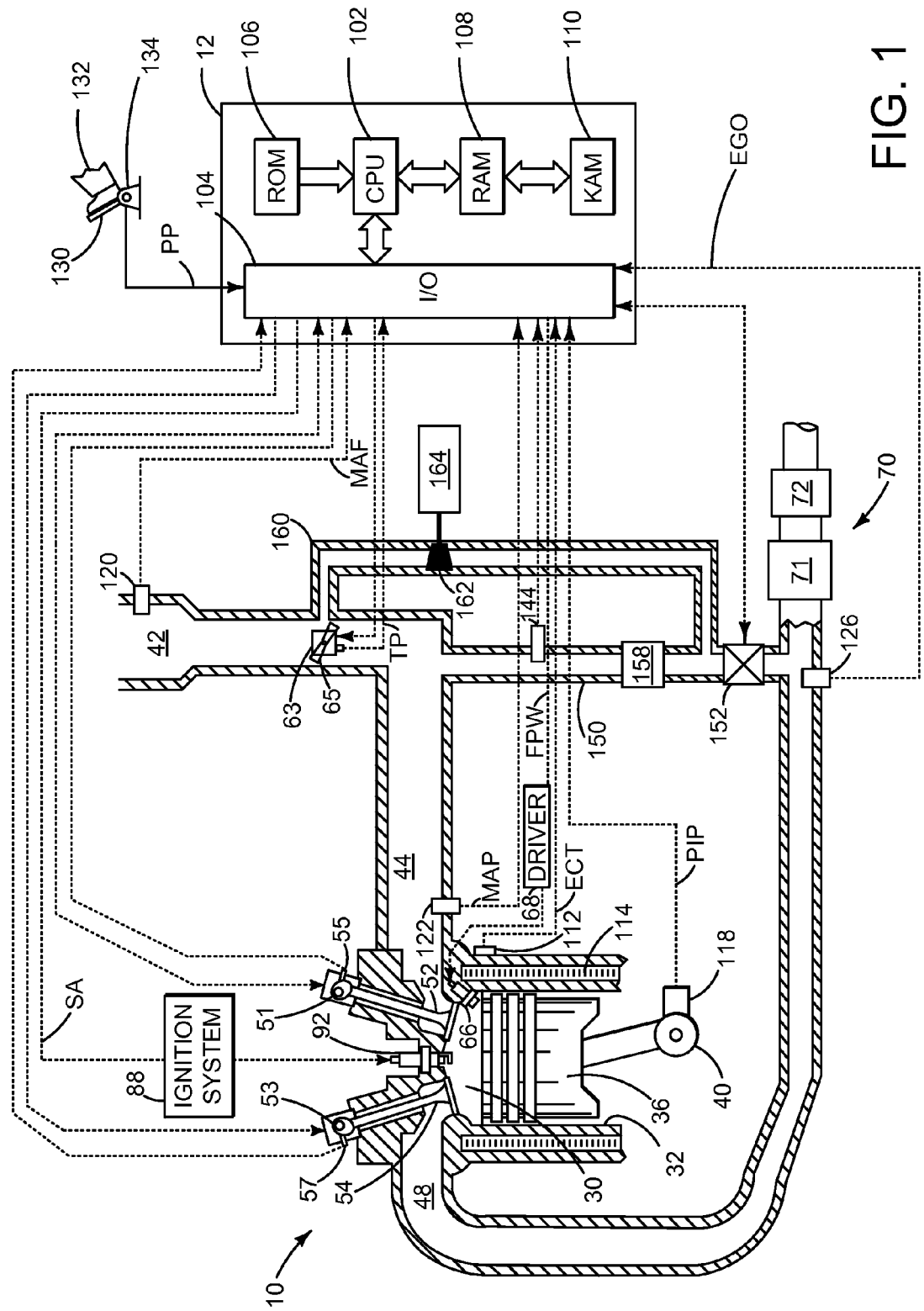
FIG. 1 schematically depicts an example cylinder of an internal combustion engine including an exhaust gas recirculation system.
Figure 2:
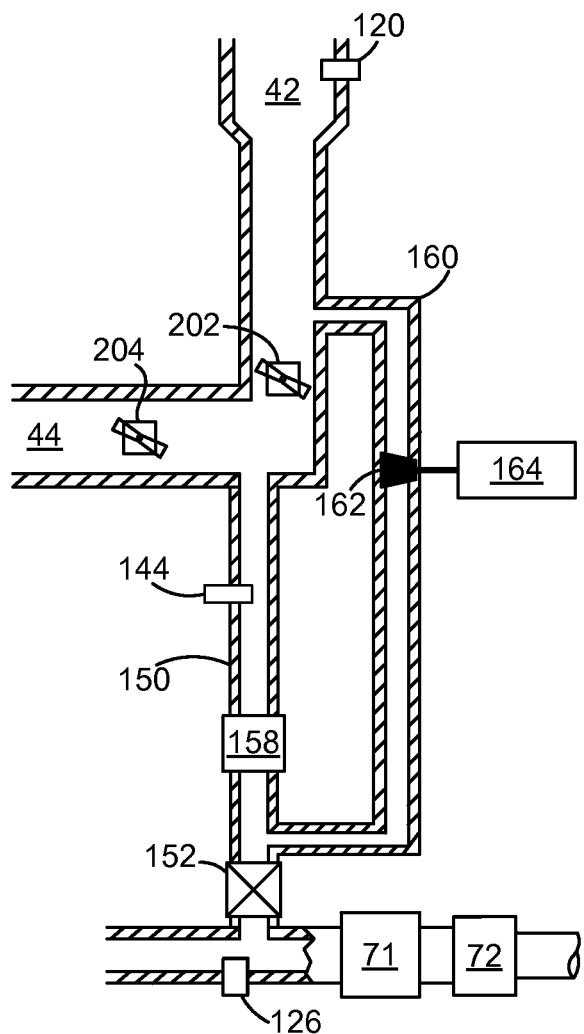
FIG. 2 shows aspects of an alternate intake and EGR passage configuration.
Figure 3:
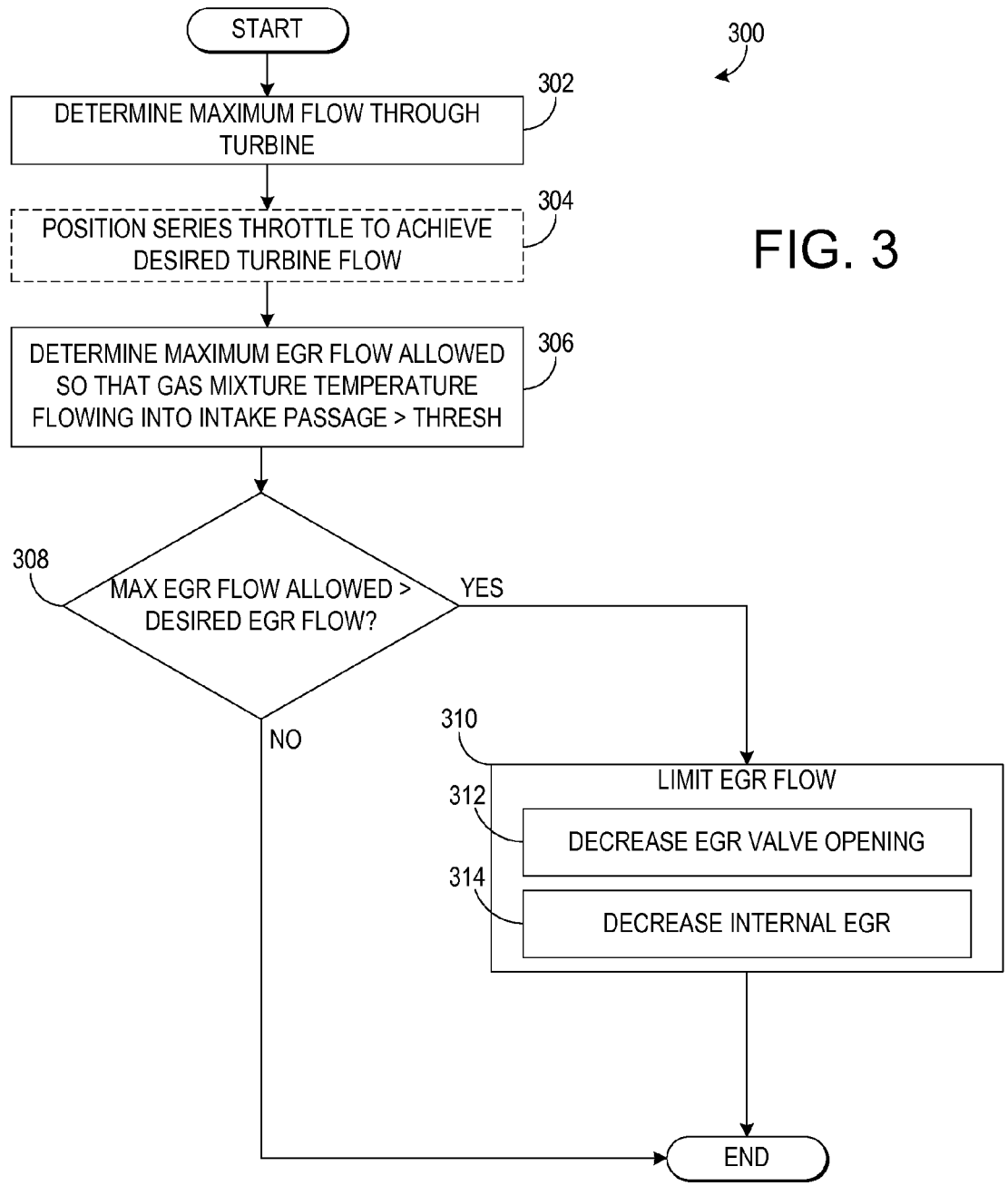
FIG. 3 shows a routine for controlling EGR gas flow.
Figure 4:
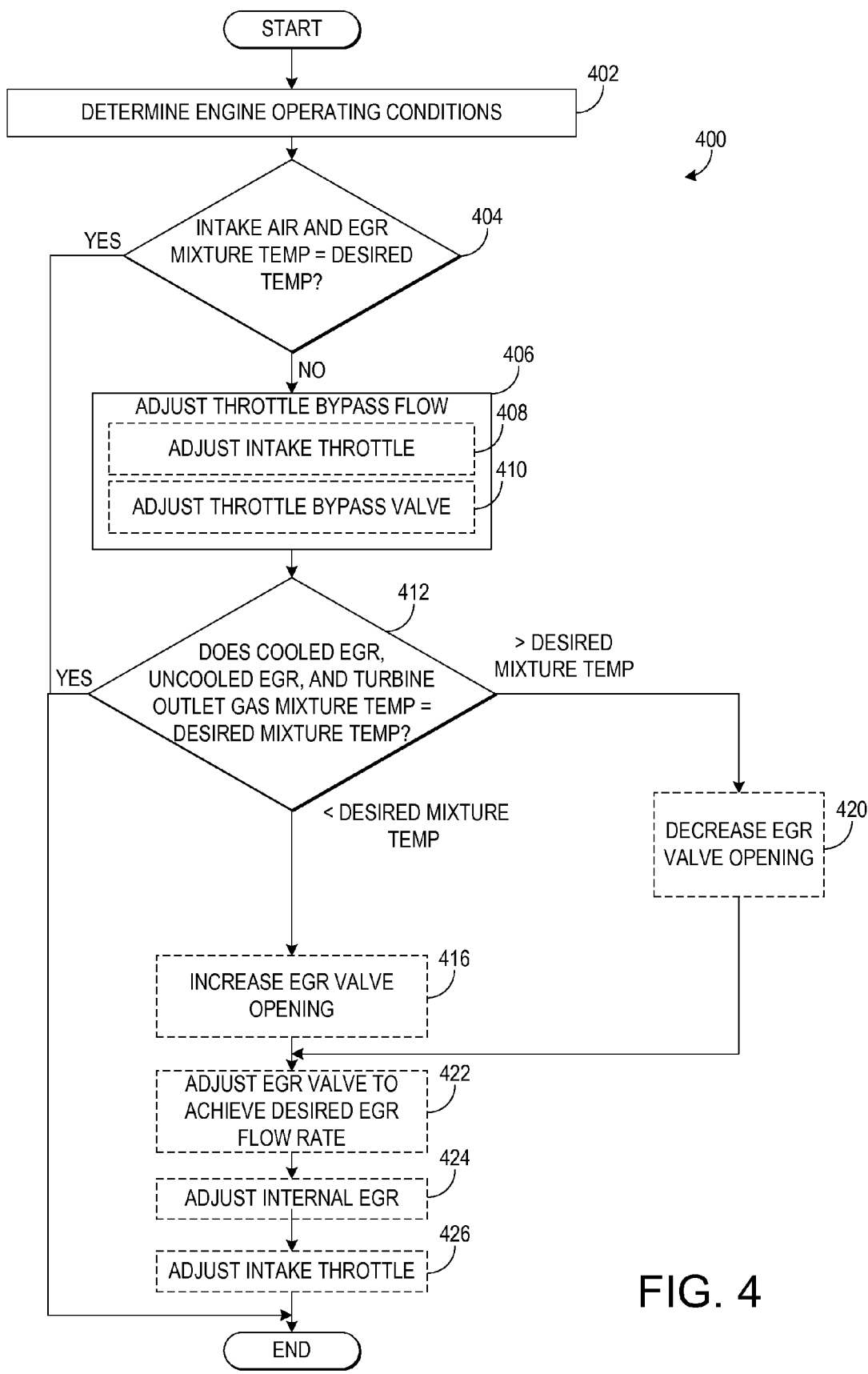
FIG. 4 shows a routine for controlling the temperature of a mixture of gasses in an intake passage.
Figure 5:
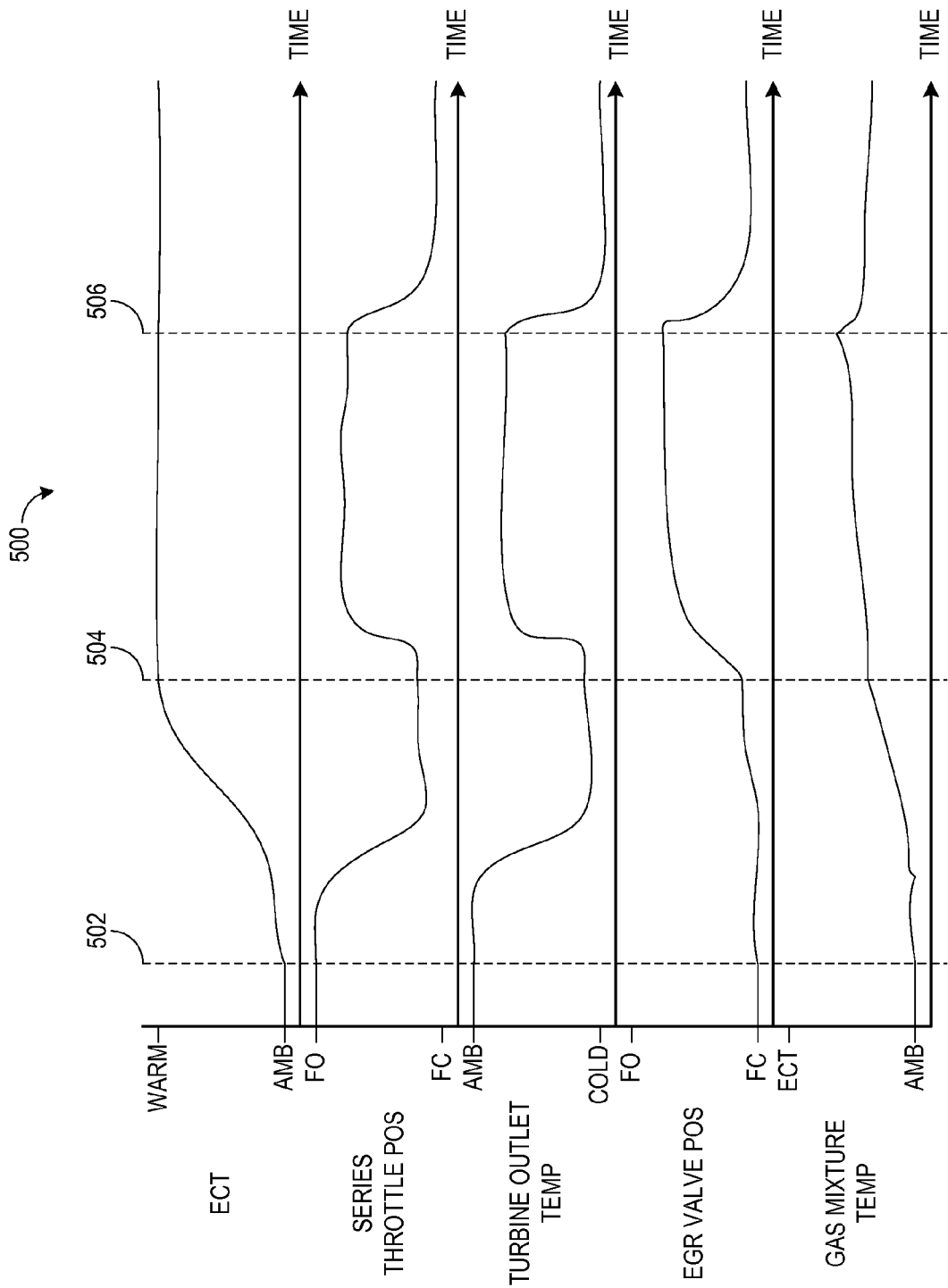
FIG. 5 shows a plot of various engine operating parameters for a portion of an exemplary drive cycle.

Various systems and methods are thus provided for controlling the temperature of outlet gasses from a throttle bypass turbine. In one embodiment, a method of operating a throttle bypass turbine comprises controlling a temperature of outlet gas flowing out of the turbine by routing the outlet gas through an exhaust gas recirculation heat exchanger positioned in an exhaust gas recirculation passage, the turbine coupled to an intake passage. FIG. 1 schematically depicts an example cylinder of an internal combustion engine including an exhaust gas recirculation system, FIG. 2 shows aspects of an alternate intake and EGR passage configuration, FIG. 3 shows a routine for controlling EGR gas flow, FIG. 4 shows a routine for controlling the temperature of a mixture of gasses in an intake passage, and FIG. 5 shows a plot of various engine operating parameters for a portion of an exemplary drive cycle. The engine of FIG. 1 also includes a controller configured to carry out the methods depicted in FIGS. 3 and 4.

FIG. 1 shows a schematic diagram of one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor (not shown) may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or another suitable type to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT. In some examples, the valve timing of exhaust valve 54 may be varied to adjust the exhaustion of exhaust gasses from cylinder 30—for example, to increase the level of exhaust gasses present in the cylinder, relative to a nominal level, when ingesting intake air into the cylinder. Such an approach is referred to herein as "internal EGR".

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include a throttle 63 having a throttle plate 65. In this particular example, the positions of throttle plate 65 may be varied by controller 12 via signals provided to an electric motor or actuator included with throttle 63, a configuration that is commonly referred to as electronic throttle control (ETC). In this manner, throttle 63 may be operated to vary the intake air provided to combustion chamber 30 among other engine cylinders. The positions of throttle plate 65 may be provided to controller 12 by throttle position signals TP. Intake passage 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 42 via an EGR passage 150. The amount of EGR (e.g., EGR flow rate) provided to intake passage 42 may be varied by controller 12 via EGR valve 152, shown positioned at the inlet of EGR passage 150. In some embodiments, a throttle may be included in the exhaust to assist in driving the EGR. Further, an EGR sensor 144 may be arranged within EGR passage 150 and may provide an indication of one or more of pressure, temperature, and concentration of the exhaust gas. Alternatively, the EGR may be controlled through a calculated value based on signals from the MAF (upstream), MAP (intake manifold), MAT (manifold gas temperature; not shown), and the crank speed sensors. Further, the EGR may be controlled based on an exhaust $O_2$ sensor and/or an intake oxygen sensor (e.g., positioned in the intake manifold). Under some conditions, the EGR system may be used to regulate the temperature of the air and fuel mixture within the combustion chamber. The EGR system shown in FIG. 1 further includes an EGR heat exchanger 158 configured to expel heat from EGR gasses to a suitable medium such as engine coolant, for example. As described in further detail below, EGR heat exchanger 158 may alter the temperature of other gasses in addition to altering the temperature of EGR gasses. Under different conditions, EGR heat exchanger 158 may heat, cool, or simultaneously heat and cool gasses flowing therethrough; as such, the EGR heat exchanger may be referred to as an "EGR cooler" and an "EGR heater".

Although not shown, engine 10 may further include a compression device such as a turbocharger or supercharger including at least a compressor arranged along intake manifold 44. For a turbocharger, the compressor may be at least partially driven by a turbine (e.g., via a shaft) arranged along exhaust passage 48. For a supercharger, the compressor may be at least partially driven by the engine and/or an electric machine, and may not include a turbine. The amount of compression provided to one or more cylinders of the engine via a turbocharger or supercharger may be varied by controller 12. For embodiments in which a turbocharger is used as a compression device, a wastegate may control the amount of exhaust gas delivered to the turbine, for example.

For the embodiments in which engine 10 includes a turbocharger, the engine may further include a high-pressure (HP) EGR system which routes exhaust gasses from upstream of the turbine of the turbocharger to downstream of the compressor of a turbocharger. In contrast, an LP EGR system may route exhaust gasses from downstream of the turbine of the turbocharger to upstream of the compressor of the turbocharger. The HP-EGR system may include its own EGR heat exchanger to expel heat from the exhaust gasses.

Exhaust gas sensor 126 is shown coupled to exhaust passage 48 upstream of emission control system 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Engine 10 further includes a throttle bypass 160 branching off intake passage 42. As shown, the inlet of bypass 160 is in fluidic communication with intake passage 42 and is positioned adjacent throttle 63, which is shown as a ported throttle. In this configuration, throttle 63 controls the proportion of intake air in intake passage 42 delivered to intake manifold 44 and to throttle bypass 160 depending on its angle in a continuously variable manner. When positioned at a fully closed position, throttle 63 may prevent intake air from flowing into bypass 160. Other configurations are possible, however, in which a non-ported throttle configuration is used; in this case, a throttle bypass valve may be positioned in bypass 160 to control airflow therethrough. The throttle bypass valve may be of various suitable types, such as an on/off valve, plunger or spool valve, a gate valve, a butterfly valve, or another suitable flow control device. Valve configurations alternative to the ones shown in FIG. 1 are possible, however. As described in further detail below with reference to FIG. 2, a series throttle may be positioned downstream of the inlet of throttle bypass 160 and upstream the outlet of EGR passage 150, with another throttle positioned downstream the outlet of the EGR passage.

Positioned downstream throttle 63 and in throttle bypass 160 is a throttle bypass turbine 162 which undergoes rotation when airflow is directed through the throttle bypass. Turbine 162 is mechanically coupled to a generator 164 such that rotation of the turbine causes the generation of current by the generator. This current may then be supplied to a battery (not shown), which may in turn provide power to various components of an electrical system of a vehicle in which engine 10 may be disposed, including but not limited to lights, pumps, fans, fuel injection, ignition, air-conditioning, etc. In some embodiments, generator 164 may function as an auxiliary generator that supplies current to the battery which also receives current from a primary generator (not shown) mechanically driven by engine 10. Controller 12 may control whether one or both of the generators charge the battery depending on various criteria, including but not limited to a state of charge (SOC) of the battery, whether the vehicle is accelerating or decelerating, generator degradation, etc.

Outlet gasses flowing out of turbine 162 proceed to the outlet of throttle bypass 160, which is in fluidic communication with EGR passage 150. The throttle bypass outlet joins EGR passage 150 downstream of EGR valve 152 and upstream of EGR heat exchanger 158. As turbine outlet gasses join EGR passage 150 upstream of EGR heat exchanger 158, their temperatures may be controlled via the EGR heat exchanger. As described in further detail below, EGR heat exchanger 158 may be utilized to control the temperature of outlet gasses from turbine 162 so that condensation and/or icing in intake passage 42 (e.g., proximate throttle 63) is reduced or prevented. Thus, in some examples, outlet gasses from turbine 162 whose relatively low temperatures might have otherwise caused condensation and/or icing in intake passage 42, may be heated by EGR heat exchanger 158 to reduce or prevent such condensation and/or icing. In some scenarios, EGR heat exchanger 158 may simultaneously heat turbine outlet gasses and cool EGR gasses, and subsequently expel respective counterparts whose temperatures have been altered. As in this example EGR heat exchanger 158 may simultaneously perform heating and cooling, it may be generally considered a heat exchanger. EGR heat exchanger 158 may perform temperature control with engine coolant or other substances, including but not limited to ambient air, low temperature coolant, etc. Alternative throttle bypass and EGR passage configurations are possible, however. For example, in other embodiments a bypass line and bypass valve may be provided to enable a selectable portion of EGR gasses flowing through EGR passage 150 to bypass EGR heat exchanger 158. Moreover, in some embodiments a second EGR valve may be positioned at the outlet of EGR passage 150, downstream of EGR heat exchanger 158.

EGR sensor 144 is shown in FIG. 1 as being positioned proximate the outlet of EGR passage 150, which may facilitate the detection of the temperature of EGR gasses which may include outlet gasses from turbine 162. EGR sensor 144 may be positioned in other locations, however, such as upstream of EGR heat exchanger 158, in which case the temperature of uncooled exhaust gas may be detected. In some embodiments, two sensors may be provided to respectively indicate the temperature of uncooled and cooled exhaust gas.

Thus, EGR valve 152 may be controlled to adjust an amount and/or rate of recirculated exhaust gas flow and achieve a desired dilution percentage of the intake air flowing into intake passage 42. A higher EGR dilution percentage may correspond to a higher proportion of recirculated exhaust gas to air than that of a lower EGR dilution percentage, for example. Controller 12 may monitor aspects of the exhaust gas flow through EGR passage 150 and adjust such flow via EGR valve 152, based on engine speed and load during engine operation to maintain combustion stability, combustion temperature, etc. Controller 12 may account for other factors that can affect EGR dilution percentage, such as the position of throttle 63, the position of a compressor bypass valve (if included), the position of a wastegate (if included), etc.

As described in further detail below with reference to FIG. 4, controller 12 may cooperatively control a variety of engine components (e.g., throttle 63, EGR valve 152, etc.) to achieve a plurality of desired aspects relating to the flow of intake and exhaust gasses—for example, these and potentially other components may be controlled to achieve a desired EGR dilution percentage, EGR flow rate, EGR temperature, and intake passage temperature proximate throttle 63 to reduce or prevent condensation and/or icing near the throttle.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_x$ trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1). Further, in some embodiments, during operation of engine 10, emission control devices 71 and 72 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

FIG. 2 shows aspects of an alternate intake and EGR passage configuration. As it is sought to illustrate the differences between the intake and EGR passage configuration shown in FIG. 2 and the intake and EGR passage configuration shown in FIG. 1, like parts are numbered similarly. Specifically, the placement and function of throttle 63 shown in FIG. 1 are modified in the configuration shown in FIG. 2. As seen in FIG. 2, a series throttle 202 is positioned downstream of the inlet of throttle bypass 160 and upstream the outlet of EGR passage 150. Series throttle 202 accordingly may affect the pressure of recirculated exhaust gas and the pressure difference across turbine 162. Further, an intake throttle 204 is positioned downstream the outlet of EGR passage 150 and upstream an engine cylinder (not shown) in intake manifold 44. Both throttles 202 and 204 may be adjusted via controller 12 in the manners described above to achieve various desired operating parameters.

FIG. 3 shows a routine 300 for controlling EGR gas flow. As described below, EGR gas flow may be controlled according to routine 300 so that the temperature of a mixture of gasses flowing into an intake passage (e.g., intake manifold) is greater than a threshold temperature. The mixture of gasses flowing into the intake passage may include ambient intake air drawn into the intake passage (e.g., in a naturally aspirated configuration, or in a boosted configuration in other embodiments), EGR gasses (e.g., one or both of cooled and uncooled EGR gasses), and outlet gasses from a turbine positioned in the intake passage routed from the outlet side of the turbine to the intake passage via an EGR passage in which the EGR gasses flow. With references to FIG. 1, routine 300 may be employed to control EGR gas flow through EGR passage 150 in view of the temperature of the gas mixture flowing into intake passage 42, which may include ambient intake air, EGR gasses flowing in the EGR passage, and outlet gasses flowing out of turbine 162 and into the EGR passage. In a particular example, routine 300 may be employed to reduce or prevent condensation and/or icing in the intake passage—for example, icing proximate an intake throttle (e.g., throttle 63 of FIG. 1). Accordingly, the threshold temperature may be selected according to a dew point and/or an icing point at which condensation and icing may respectively form proximate the intake throttle. In some examples, the threshold temperature may be one of the dew point and the icing point.

At 302 of routine 300, the maximum flow through the turbine is determined. The maximum flow may be the maximum flow through the turbine that can be physically realized according to various instant operating conditions. As such, determination of the maximum turbine flow may include an assessment of one or more operating conditions, including but not limited to air charge temperature (ACT), humidity, and engine coolant temperature (ECT).

At 304 of routine 300, a series throttle may be positioned to achieve a desired flow through the turbine, for embodiments in which a series throttle controlling flow through the turbine is provided. The series throttle may be positioned at least in part in view of its effects on the pressure differential across an EGR valve—for example, increasingly opening the series throttle may increase the pressure differential across the EGR valve. Positioning of the series throttle may also include an assessment of one or more operating conditions, including but not limited to air mass (AM) and a desired pressure ratio (e.g., across the series throttle).

At 306 of routine 300, the maximum EGR flow allowed is determined so that the temperature of a gas mixture flowing into the intake passage is greater than the threshold temperature. As described above, the gas mixture may comprise various constituent gasses, including but not limited to intake air, EGR gasses, and turbine outlet gasses. The maximum EGR flow may be determined at least in part in view of the effects of EGR flow on humidity, which in turn may affect condensation and/or icing in the intake passage. For example, as the EGR valve is increasingly opened, humidity in the intake passage increases. Determination of the maximum EGR flow allowed may also include an assessment of one or more operating conditions, including but not limited to ECT, humidity, ACT, etc.

At 308 of routine 300, it is determined whether the maximum EGR flow allowed determined at 306 exceeds a desired EGR flow. The desired EGR flow may be determined based on various suitable criteria, such as a desired cylinder/combustion temperature, emissions level, etc. If it is determined that the maximum EGR flow allowed does not exceed the desired EGR flow (NO), routine 300 ends. If it is determined that the maximum EGR flow allowed does exceed the desired EGR flow (YES), routine 300 proceeds to 310.

At 310, EGR flow (through the EGR passage) is limited. The EGR flow is limited so that the actual EGR flow through the EGR passage does not exceed the maximum EGR flow allowed, and thus so that condensation and/or icing in the intake passage is mitigated or prevented. Limiting the EGR flow may include, at 312, decreasing the opening of the EGR valve. Limiting the EGR flow may include at, 314, decreasing internal EGR (e.g., by adjusting intake and/or exhaust valve timing).

FIG. 4 shows a routine 400 for controlling the temperature of a mixture of gasses in an intake passage, including ambient intake air drawn into the intake passage (e.g., in a naturally aspirated configuration, or in a boosted configuration in other embodiments), EGR gasses (e.g., one or both of cooled and uncooled EGR gasses), and outlet gasses from a turbine positioned in the intake passage routed from the outlet side of the turbine to the intake passage via an EGR passage. With references to FIG. 1, routine 400 may be employed to control the temperature of a mixture of gasses drawn into intake passage 42, including one or both of cooled and uncooled EGR gasses in EGR passage 150, and outlet gasses flowing out of turbine 162 and into the intake passage via the EGR passage. In a particular example, routine 400 may be employed to reduce or prevent condensation and/or icing in the intake passage—for example, icing proximate an intake throttle (e.g., throttle 63 of FIG. 1).

At 402 of routine 400, one or more engine operating conditions are determined. For example, one or both of a dew and/or icing point in the intake passage may be determined to assess whether conditions amenable to condensation and/or icing in the intake passage are present. The engine operating conditions may further include engine coolant temperature, ambient temperature, intake air humidity, EGR gas temperature, and EGR gas flow rate. One or more of these operating conditions, potentially in addition to others, may be used to determine the dew and/or icing points, for example. Determining the engine operating conditions may further include assessing whether the engine is under cold start conditions or whether the ambient temperature is less than a threshold temperature.

At 404 of routine 400, it is determined whether the temperature of a mixture of intake air and EGR gasses is equal to a desired temperature. The desired temperature may be based on one or more of the instantaneous engine coolant temperature, ambient temperature, EGR dilution percentage (e.g., ratio of EGR flow to intake air flow), and particularly the dew and/or icing point at which condensation and/or icing is likely to occur in the intake passage. If it is determined that the mixture is equal to the desired temperature (YES), routine 400 ends. If it is instead determined that the mixture is not equal to the desired temperature (NO), routine 400 moves to 406.

At 406 of routine 400, the flow through a throttle bypass (e.g., throttle bypass 160 of FIG. 1) is adjusted. Adjusting the flow through the throttle bypass may include, at 408, adjusting the position of an intake throttle, for example for configurations in which the intake throttle (e.g., intake throttle 63 of FIG. 1) modulates both flow through the intake passage into an intake manifold and flow through the throttle bypass. Alternatively or additionally, adjusting the flow through the throttle bypass may include, at 410, adjusting a throttle bypass valve positioned in the throttle bypass and operable to modulate flow through the throttle bypass. In this way, temperature decreases due to pressure differences across the throttle bypass turbine may be compensated.

At 412 of routine 400, it is determined whether the temperature of a mixture of EGR gasses (e.g., cooled and/or uncooled EGR gas) and outlet gasses from the turbine is equal to a desired mixture temperature. If it is determined that the mixture temperature is equal to the desired mixture temperature (YES), routine 400 ends. The desired mixture temperature may be based on one or more of the operating parameters described above, and particularly the conditions that indicate the likeliness of the formation of condensation and/or icing in the intake passage. If it is determined that the mixture temperature is less than the desired mixture temperature, an EGR valve which controls exhaust gas flow into the EGR passage may be optionally adjusted. In particular, the EGR valve opening may be optionally increased at 416 if the mixture temperature is less than the desired mixture temperature. Here, additional exhaust gas may be introduced to the intake passage to increase temperatures thereat in order to reduce the chance of condensation and/or icing in the intake passage, even if the EGR bypass has been closed and/or flow through the throttle bypass has been minimized, for example.

In some scenarios in which the temperature of a coolant in the EGR heat exchanger is below a threshold temperature, a relatively greater amount of EGR may be employed to heat turbine outlet gasses and raise their temperature above the coolant temperature. In this way, sufficient heating of the turbine outlet gasses may be achieved even when the EGR heat exchanger coolant temperature is relatively low.

If, however, it is determined at 412 that the mixture temperature is greater than the desired mixture temperature, the EGR valve opening may be optionally decreased at 420.

Here, exhaust gas flowing into the intake passage may be reduced to decrease temperatures thereat.

The EGR valve may also be optionally adjusted to achieve a desired EGR flow rate at 422. The desired EGR rate may be selected based on one or more of the engine operating conditions described above and to achieve a desired combustion stability, combustion temperature, emissions levels, fuel economy, etc.

At 424 of routine 400, internal EGR may be adjusted. As described above, the amount of internal EGR may be adjusted by varying intake and/or exhaust valve timing of one or more engine cylinders. For example, the amount of internal EGR may be increased by advancing exhaust valve closing, whereas the amount of internal EGR may be decreased by retarding exhaust valve closing. As with so-called "external EGR"—that is, EGR provided to the intake passage via the EGR passage—the internal EGR amount may be increased if the mixture temperature is less than the desired temperature, whereas the internal EGR amount may be decreased if the mixture temperature is greater than the desired temperature.

At 426 of routine 400, the intake throttle may be adjusted. For example, the intake throttle opening amount may be reduced (e.g., moved toward its fully closed position) if the mixture temperature is less than the desired mixture temperature. In some examples, this may increase the proportion of EGR gasses to intake air in intake passage. Conversely, the intake throttle opening amount may be increased (e.g., moved toward its fully open position) if the mixture temperature is greater than the desired mixture temperature, which may decrease the proportion of EGR gasses to intake air in the intake passage. Following 426, routine 400 ends.

Thus, as shown and described, routine 400 may be employed to achieve a desired mixture temperature of cooled EGR and/or uncooled EGR gasses and intake air. Routine 400 may be specifically employed to achieve a desired temperature of outlet gasses from the turbine in the throttle bypass, in addition to the mixture temperature. In some scenarios, the EGR heat exchanger in the EGR passage may be utilized to simultaneously cool EGR gasses drawn from the exhaust passage and heat the turbine outlet gasses, while reducing or preventing condensation and/or icing in the intake passage—particularly icing proximate the intake throttle, for example. It will be appreciated that routine 400 may be performed on an iterative basis throughout engine operation to achieve the desired operating parameters described herein. Moreover, various modifications may be made to routine 400 without departing from the scope of this disclosure. For example, the order of throttle bypass flow adjustment, EGR bypass valve adjustment, EGR valve adjustment, internal EGR adjustment, and intake throttle adjustment may be modified from the order shown in FIG. 4. Still further, routine 400 may be performed at least partially simultaneously with routine 300, or in a combined routine with routine 300.

FIG. 5 shows a plot 500 of various engine operating parameters for a portion of an exemplary drive cycle. Specifically, the engine operating parameters shown include the temperature of coolant flowing through an engine (e.g., engine 10 of FIG. 1) varying between a relatively warm temperature (labeled "WARM" in FIG. 5) and an ambient temperature (labeled "AMB" in FIG. 5), the position of a series throttle controlling flow through an intake turbine such as turbine 162 of FIG. 1 varying between a fully open position (labeled "FO" in FIG. 5) and a fully closed position (labeled "FC" in FIG. 5), the temperature of outlet gasses from the intake turbine varying between the ambient temperature and a relatively cold temperature (labeled "COLD" in FIG. 5), the position of an EGR valve such as EGR valve 152 of FIG. 1 varying between a fully open position and a fully closed position, and the temperature of a gas mixture entering an intake passage from an EGR passage, varying between ECT temperature and the ambient temperature. Plot 500 may illustrate how these engine operating parameters may vary as a function of time when one or both of routines 300 and 400 are employed during operation of an engine including the series throttle, for example.

At the start of the depicted drive cycle, the engine is not running. The engine then starts as indicated at 502. Prior to this time, the depicted engine operating parameters remain in steady state; ECT remains at the ambient temperature, the series throttle position remains fully open, the turbine outlet gas temperature remains at the ambient temperature, the EGR valve position remains fully closed, and the gas mixture temperature remains at the ambient temperature. Following the engine start at 502, ECT steadily increases until a time indicated at 504 where the ECT remains approximately constant for the remainder of the drive cycle. Between 502 and 504, the series throttle is steadily closed until it reaches an approximately constant position that is highly but not fully closed. The turbine outlet temperature exhibits similar behavior during this time, decreasing from the ambient temperature until reaching an approximately constant temperature that is relatively cold and less than the ambient temperature. From time 502 to time 504, the EGR valve position is gradually increased from the fully closed position to a slightly more open position, and, during this time, the gas mixture temperature also gradually increases, from the ambient temperature to a relatively higher temperature.

At a time shortly after time 504, a change in the series throttle position is prompted, for example due to the gas mixture temperature being unacceptably low for the instant operating conditions. Accordingly, the series throttle position is modified from a position relatively close to the fully closed position to a relatively more open position relatively close to the fully open position. Here, the series throttle may have been opened to decrease the pressure differential across the turbine and the consequent cooling, for example. A corresponding increase in the turbine outlet gas temperature and gas mixture temperature is observed. Further, the EGR valve position is moved toward the fully open position to increase EGR flow and raise the gas mixture temperature.

At a time 506, the series throttle position and EGR valve positions are once more modified, both being brought close to (e.g., within 5% of) their fully closed positions. Closing of these valves may have been prompted due to determining that the desired EGR flow exceeded the maximum allowable EGR flow for the instant operating conditions, for example. Accordingly, EGR flow, and flow through a bypass passage in which the turbine is disposed, are limited. As a result, the turbine outlet temperature reaches remains at a relatively low temperature; however, the gas mixture temperature slightly decreases, but remains, within a relatively intermediate range of temperatures between ECT and the ambient temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a throttle bypass turbine, comprising:
routing outlet gas flowing out of the throttle bypass turbine through an exhaust gas recirculation (EGR) heat exchanger positioned in an EGR passage, the throttle bypass turbine positioned in a throttle bypass and coupled to an intake passage, where the intake passage connects intake air to the EGR passage upstream of the EGR heat exchanger via the throttle bypass.

2. The method of claim 1, further comprising:
determining one or both of a dew point and an icing point at which condensation and ice respectively form in the intake passage; and
adjusting one or more engine operating parameters in response to the determination.

3. The method of claim 2, wherein the one or more engine operating parameters include a flow rate of exhaust gas through the EGR passage.

4. The method of claim 2, wherein the one or more engine operating parameters include a temperature of a mixture of the outlet gas and intake air in the intake passage.

5. The method of claim 4, wherein the temperature of the mixture is adjusted by adjusting a flow rate of the outlet gas.

6. The method of claim 2, wherein the one or more engine operating parameters include an intake throttle position.

7. The method of claim 6, wherein the intake throttle is configured to modulate gas flow through the intake passage and flow through the throttle bypass turbine, an inlet of the throttle bypass being in fluidic communication with the intake passage, an outlet of the throttle bypass being in fluidic communication with the EGR passage.

8. The method of claim 1, wherein the EGR heat exchanger simultaneously cools exhaust gas and heats the outlet gas flowing out of the turbine.

9. The method of claim 1, further comprising:
determining a maximum allowable EGR flow so that a temperature of a gas mixture flowing into the intake passage is greater than a threshold;
determining a desired EGR flow; and
if the maximum allowable EGR flow is greater than the desired EGR flow, limiting EGR flow through the EGR passage.

10. An internal combustion engine, comprising:
an intake passage;
an exhaust gas recirculation passage configured to route at least a portion of exhaust gas to the intake passage;
a throttle bypass coupled to the intake passage at an inlet and to the exhaust gas recirculation passage at an outlet, the throttle bypass including a turbine; and
a heat exchanger positioned in the exhaust gas recirculation passage downstream of the throttle bypass outlet and expelling the portion of the exhaust gas and outlet gas from the turbine.

11. The internal combustion engine of claim 10, wherein the turbine is coupled to a generator.

12. The internal combustion engine of claim 10, further comprising an exhaust gas recirculation valve positioned downstream of the heat exchanger in the exhaust gas recirculation passage.

13. The internal combustion engine of claim 10, further comprising an intake throttle configured to modulate gas flow into an intake manifold downstream of the intake passage and gas flow into the throttle bypass.

14. The internal combustion engine of claim 13, wherein the intake throttle is a ported throttle.

15. The internal combustion engine of claim 10, further comprising:
a series throttle positioned in the intake passage downstream of the inlet of the throttle bypass.

16. The internal combustion engine of claim 15, further comprising an intake throttle positioned downstream an outlet of the exhaust gas recirculation passage and upstream of an intake manifold.

17. The internal combustion engine of claim 10, further comprising a throttle bypass valve positioned in the throttle bypass upstream of the turbine, the throttle bypass valve configured to modulate gas flow through the turbine.

18. A method of operating a throttle bypass turbine, comprising:
routing outlet gas flowing out of the throttle bypass turbine through an exhaust gas recirculation heat exchanger positioned in an exhaust gas recirculation passage, the throttle bypass turbine coupled to an intake passage;
determining one or both of a dew point and an icing point at which condensation and ice respectively form in the intake passage; and
adjusting one or more engine operating parameters in response to the determination, wherein the one or more engine operating parameters include an intake throttle position, wherein the intake throttle is configured to modulate gas flow through the throttle bypass turbine, the throttle bypass turbine located in a throttle bypass, an inlet of the throttle bypass being in fluidic communication with the intake passage, an outlet of the throttle bypass being in fluidic communication with the exhaust gas recirculation passage.

\* \* \* \* \*